United States Patent
Chiang (10) Patent No.: US 7,240,798 B1
(45) Date of Patent: Jul. 10, 2007

(54) FASTENER FOR PACKAGING

(76) Inventor: Chen-Cheng Chiang, No. 155, Kan Cheng Rd., Pan Chiao City, Taipei Hsien (TW)

( * ) Notice: Subject to any disclaimer, the term of this patent is extended or adjusted under 35 U.S.C. 154(b) by 51 days.

(21) Appl. No.: 11/316,741

(22) Filed: Dec. 27, 2005

(51) Int. Cl.
*B65D 1/34* (2006.01)

(52) U.S. Cl. .................................. 206/562; 220/23.89

(58) Field of Classification Search ............... 206/1.5, 206/557, 562–564, 363–366, 6.1, 566, 514, 206/518; 24/287, 530, 542; 220/23.83, 220/23.87, 23.89, 23.9, 495.01–495.03, 495.05
See application file for complete search history.

(56) References Cited

U.S. PATENT DOCUMENTS

| | | | |
|---|---|---|---|
| 3,358,878 A * | 12/1967 | Nathan et al. ........... 220/23.83 |
| 3,944,109 A * | 3/1976 | Holz ........................ 220/23.83 |
| 5,305,902 A * | 4/1994 | Vozick ........................ 24/287 |
| 5,441,707 A * | 8/1995 | Lewis et al. ............. 220/23.86 |
| 6,230,889 B1 * | 5/2001 | Chen ........................... 206/1.5 |
| 6,585,942 B1 * | 7/2003 | Bussell et al. .............. 206/363 |
| 6,769,546 B2 * | 8/2004 | Busch ........................ 206/366 |

* cited by examiner

*Primary Examiner*—Luan K. Bui
(74) *Attorney, Agent, or Firm*—Leong C. Lei (57) ABSTRACT

A fastener for a packaging is disclosed. The fastener comprises a box body, a tray and a fastener having a support arm and an arch-shaped arm, characterized in that the side frame of the box body and the bottom of the box body form into a cavity, and the inner sidewall of the side frame is a semi-dovetail slot and the side edge of the tray is a recessed platform, and the support arm and the arch-shaped arm are engaged at the semi-dovetail slot, and the tray positioned at the upper end of the fastener is pressed against the recessed platform such that the tray is fastened at the cavity of the box body, whereby the loading and unloading of the tray are easy and the packaging is re-usable.

4 Claims, 15 Drawing Sheets

FASTENER FOR PACKAGING

BACKGROUND OF THE INVENTION (a) Technical Field of the Invention

The present invention relates to a fastener, and in particular, a fastener for securing a box body to a tray.

(b) Description of the Prior Art

Generally, a packaging box includes one or more than one tray for holding objects. The materials for the box body and the tray are different and therefore, the tray can easily slide off the box body. To solve this drawback, normally the tray is glued onto the box body. However, this solution has increased the manufacturing process.

The box body is provided with a window at the bottom of the box body to allow the object in the box to be visible. A transparent plate is adhered onto it and therefore the tray has to be glued. These additional manufacturing processes increase cost of production.

In view of the above, it is a main object of the present invention to provide a fastener for packaging which mitigates the above drawbacks.

SUMMARY OF THE INVENTION

The primary purpose of the present invention is to provide a fastener for packaging comprising a box body, a tray and a fastener having a support arm and an arch-shaped arm, characterized in that the side frame of the box body and the bottom of the box body form into a cavity, and the inner sidewall of the side frame is a semi-dovetail slot and the side edge of the tray is a recessed platform, and the support arm and the arch-shaped arm are engaged at the semi-dovetail slot, and the tray positioned at the upper end of the fastener is pressed against the recessed platform such that the tray is fastened at the cavity of the box body, whereby the loading and unloading of the tray are easy and the packaging is re-usable.

Yet another object of the present invention is to provide a fastener for a packaging, wherein the fastener includes a c-shaped fastener and a r-shaped fastener.

Still a further object of the present invention is to provide a fastener for a packaging, wherein the side edge of the recessed platform is a protruded peg in combination with the c-shaped fastener or the r-shaped fastener, and the fastener secures firmly with the tray.

Yet still a further object of the present invention is to provide a fastener for a packaging, wherein the box body is provided with a window with a transparent covering plate, and the covering plate has a step-like recess for engagement.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Referring to FIGS. 1 to 4, there is shown a fastener structure of a packaging box including a box body 10, a fastener 20 and a tray 30.

The box body 10 includes a side frame 11 and a box bottom 12, forming into a cavity for holding a tray 30 which is used to keep items. The internal sidewall of the side frame is a semi-dovetail slot 13 and the upper side edge of the tray 30 is a recessed platform 31 in combination with the pressing board 23 of the tray 23. The elastic fastener 20 includes a support arm and a connected arch-shaped arm, forming into a pegging face. The upper end of the arch-shaped arm is extended to form a tray pressing plate, the tray pressing plate to the recessed platform and the support arm and the arch-shaped arm are engaged with the semi-dovetail slot such that the tray is secured to the cavity. The box body is provided with a window 14 mounted with a transparent plate 40. Similarly, the engagement is by means of the semi-dovetail slot engagement such that consumer can see the content within the box body.

The fastener 20 includes a C-shaped fastener and a r-shaped fastener which are shown in FIGS. 5 to 8. The support arm 21 is connected to the arch-shaped arm 22, and the arch-shaped arm is extended to form a tray pressing plate 23.

Figure 1:
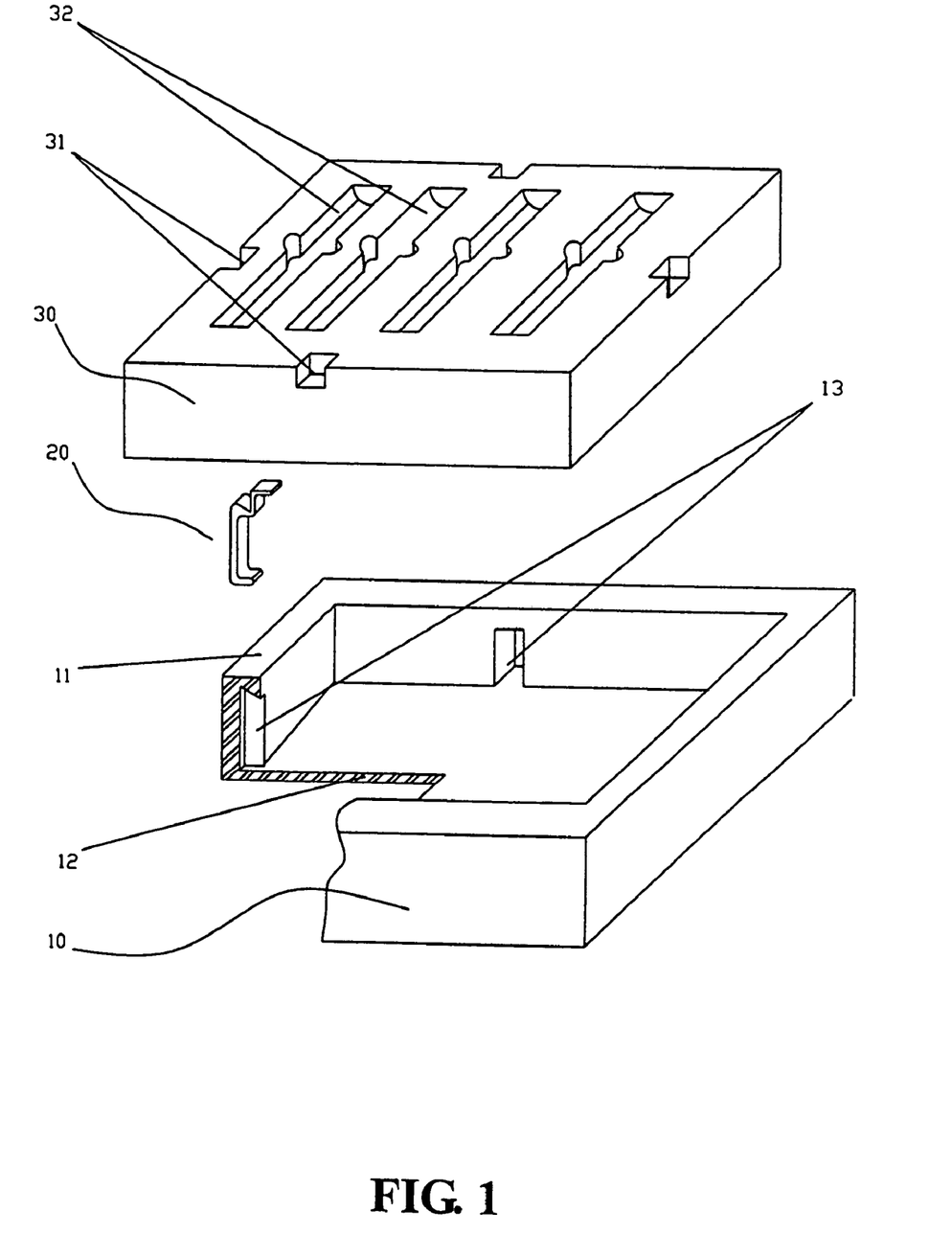
FIG. 1 is an exploded perspective view of a packaging fastener of the present invention.
Figure 2:
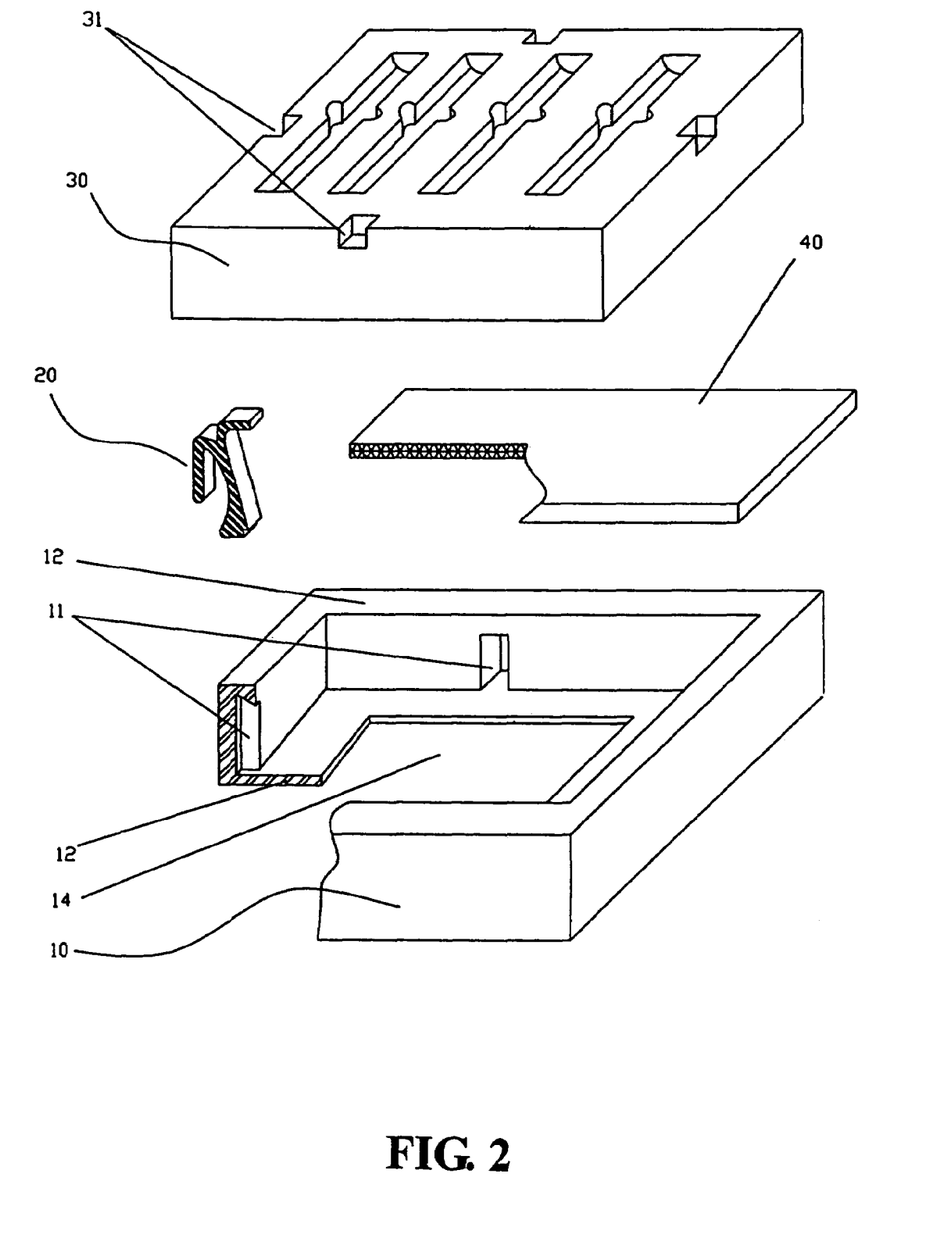
FIG. 2 is an exploded perspective view of another preferred embodiment of the packaging fastener of the present invention.
Figure 3:
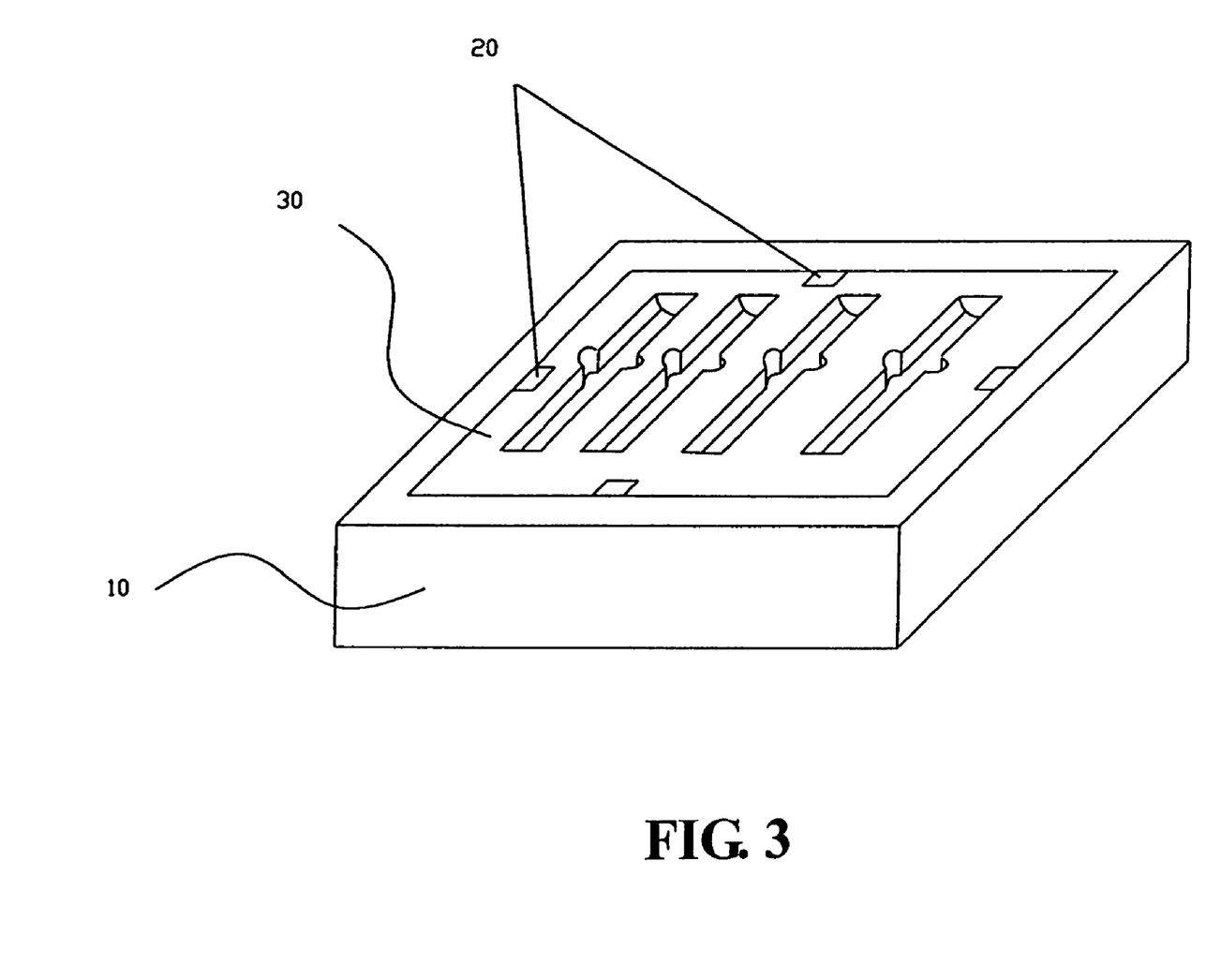
FIG. 3 is a perspective view of the packaging fastener of the present invention.
Figure 4:
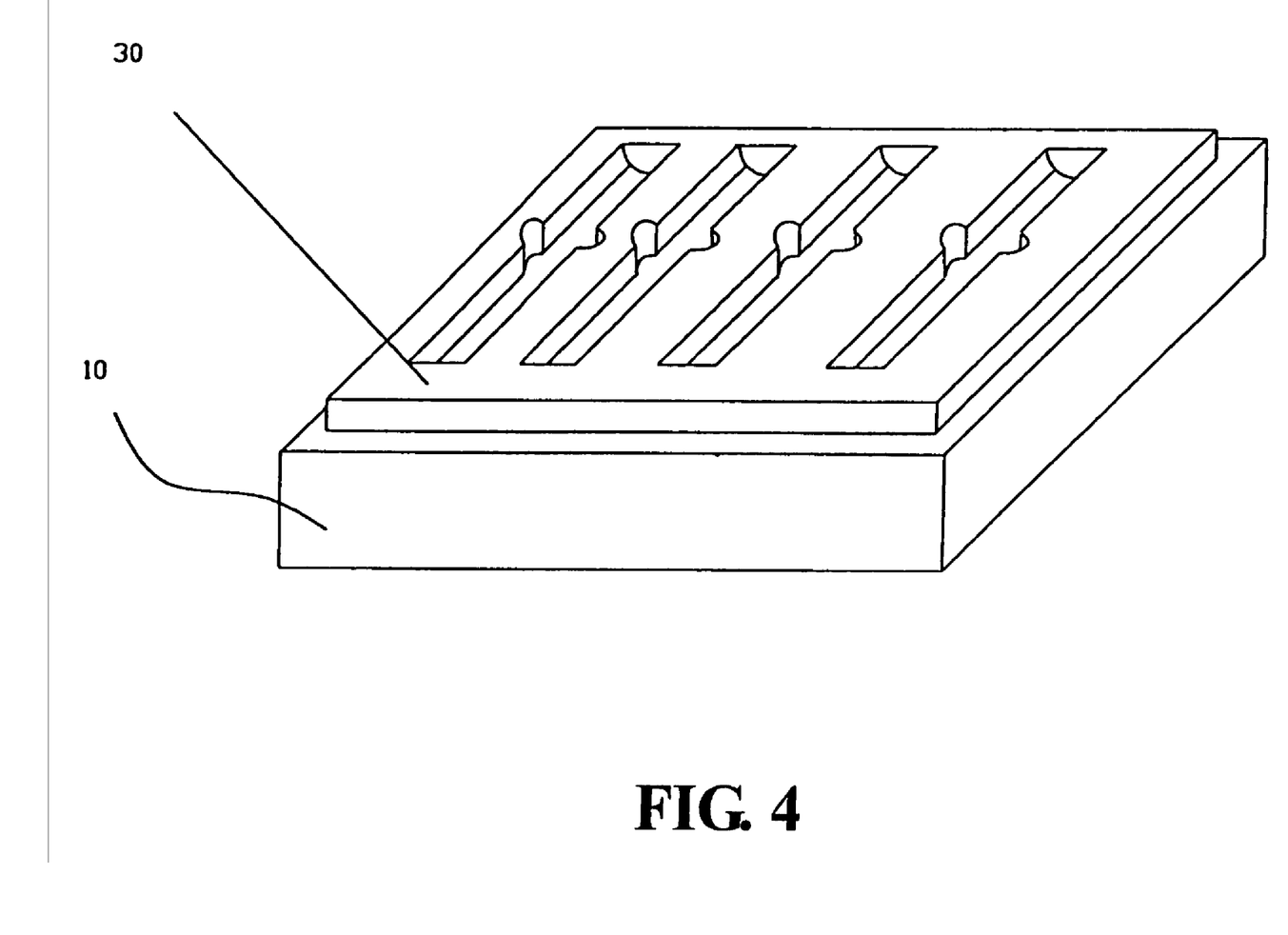
FIG. 4 is another perspective view of the packaging fastener of the present invention.
Figure 5:
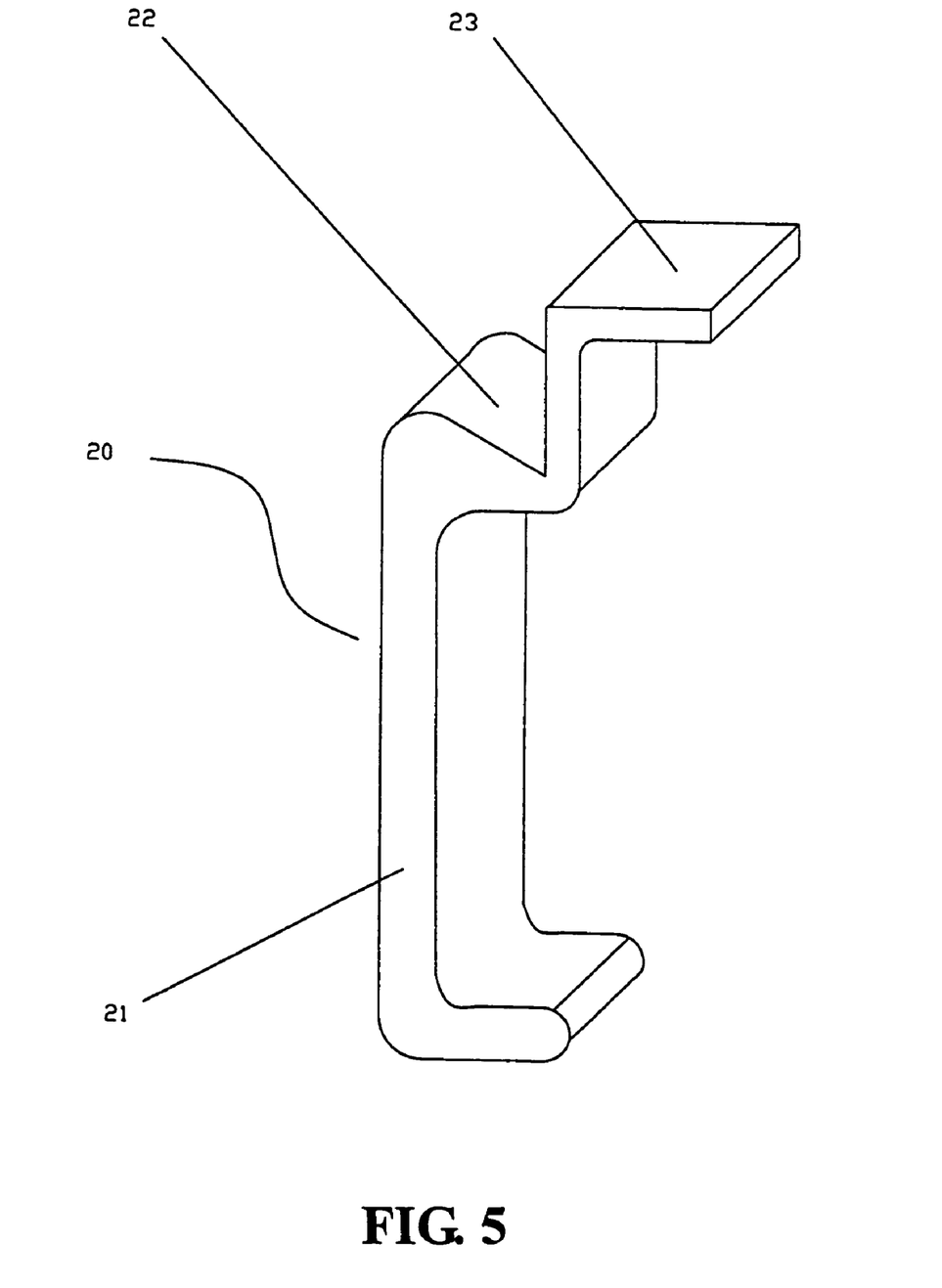
FIG. 5 is a perspective view of a fastener component in accordance with the present invention.
Figure 6:
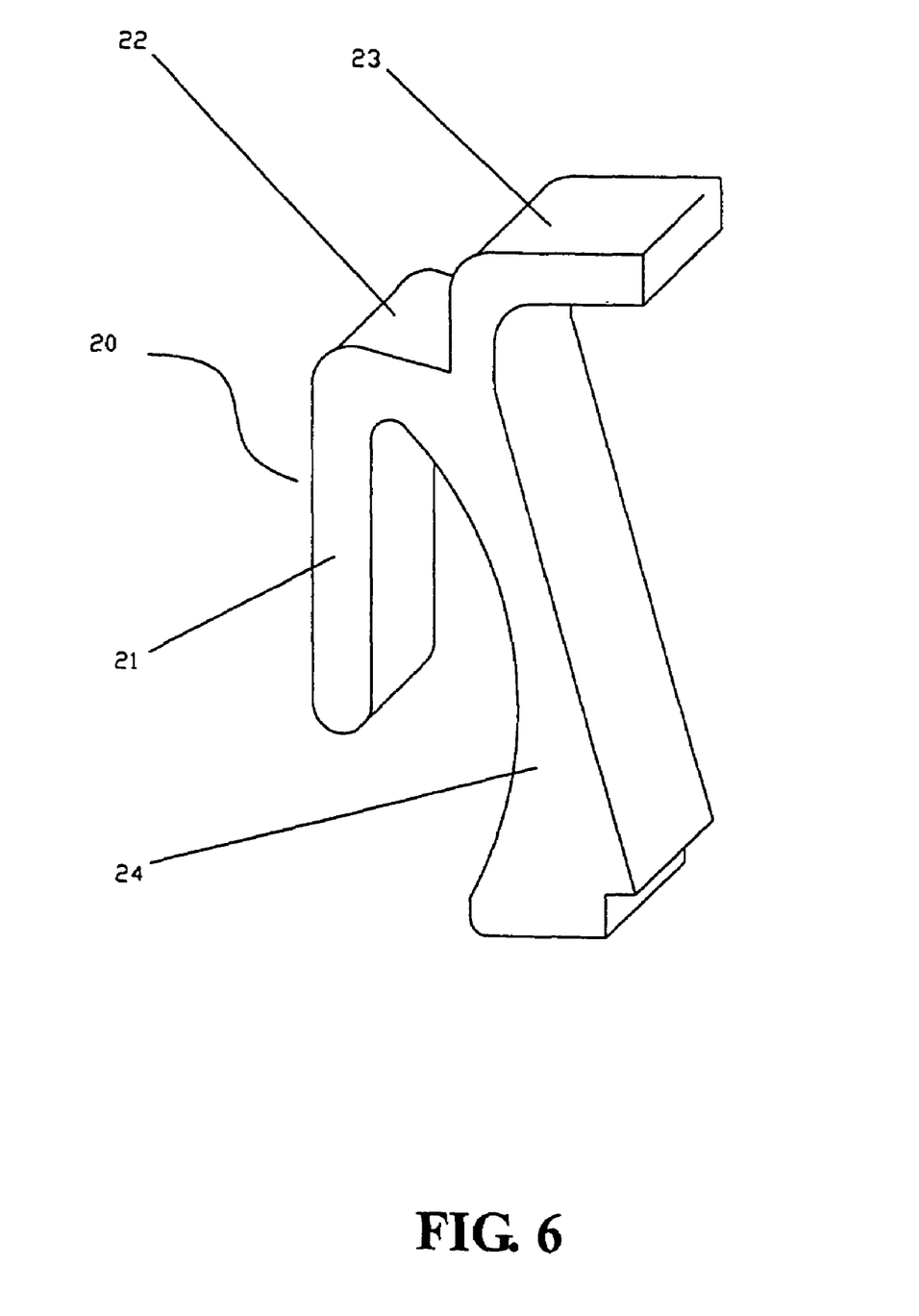
FIG. 6 is a perspective view of another fastener component in accordance with the present invention.
Figure 7:
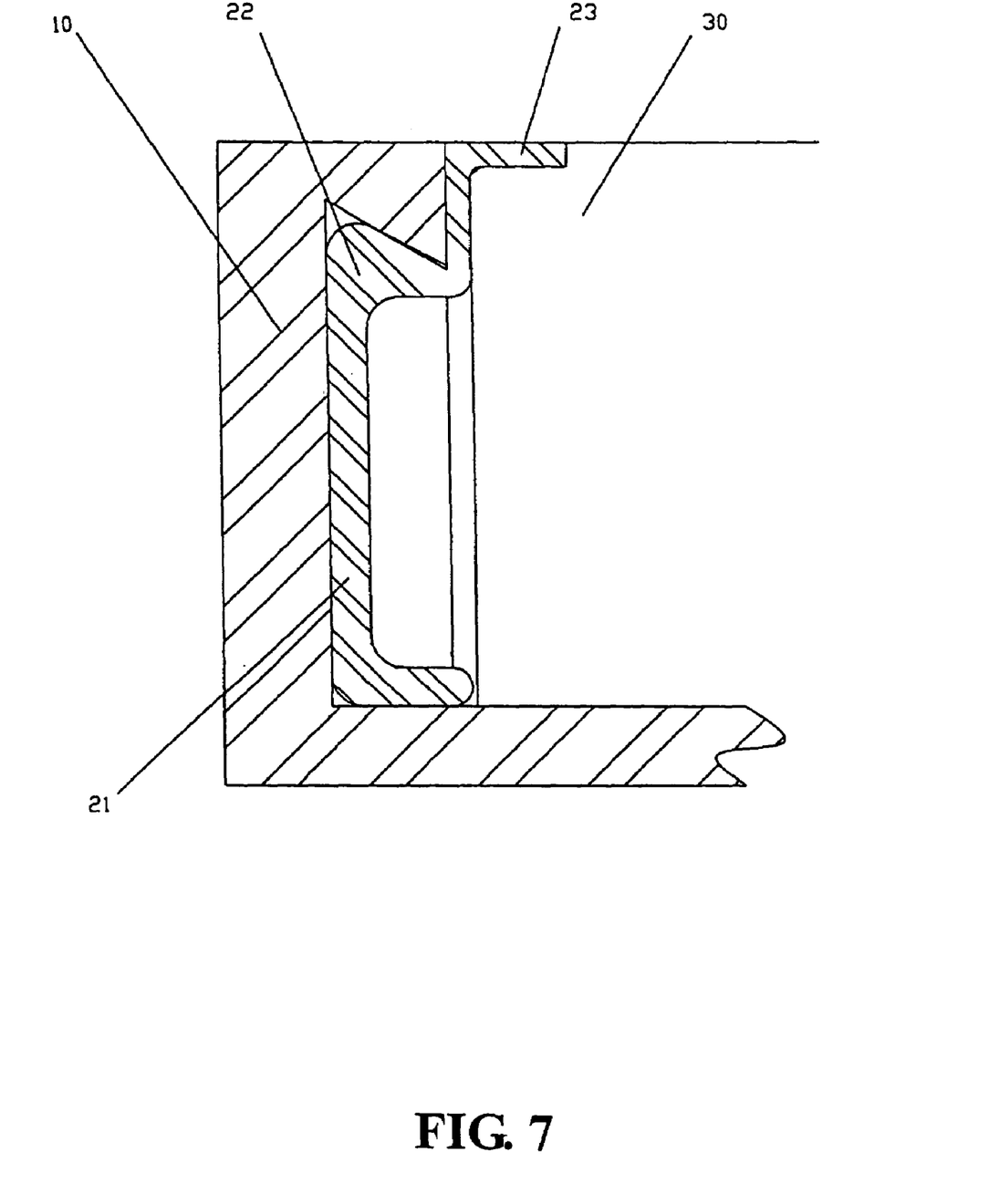
FIGS. 7 to 15 are sectional views of the packaging fastener of the present invention.
Figure 8:
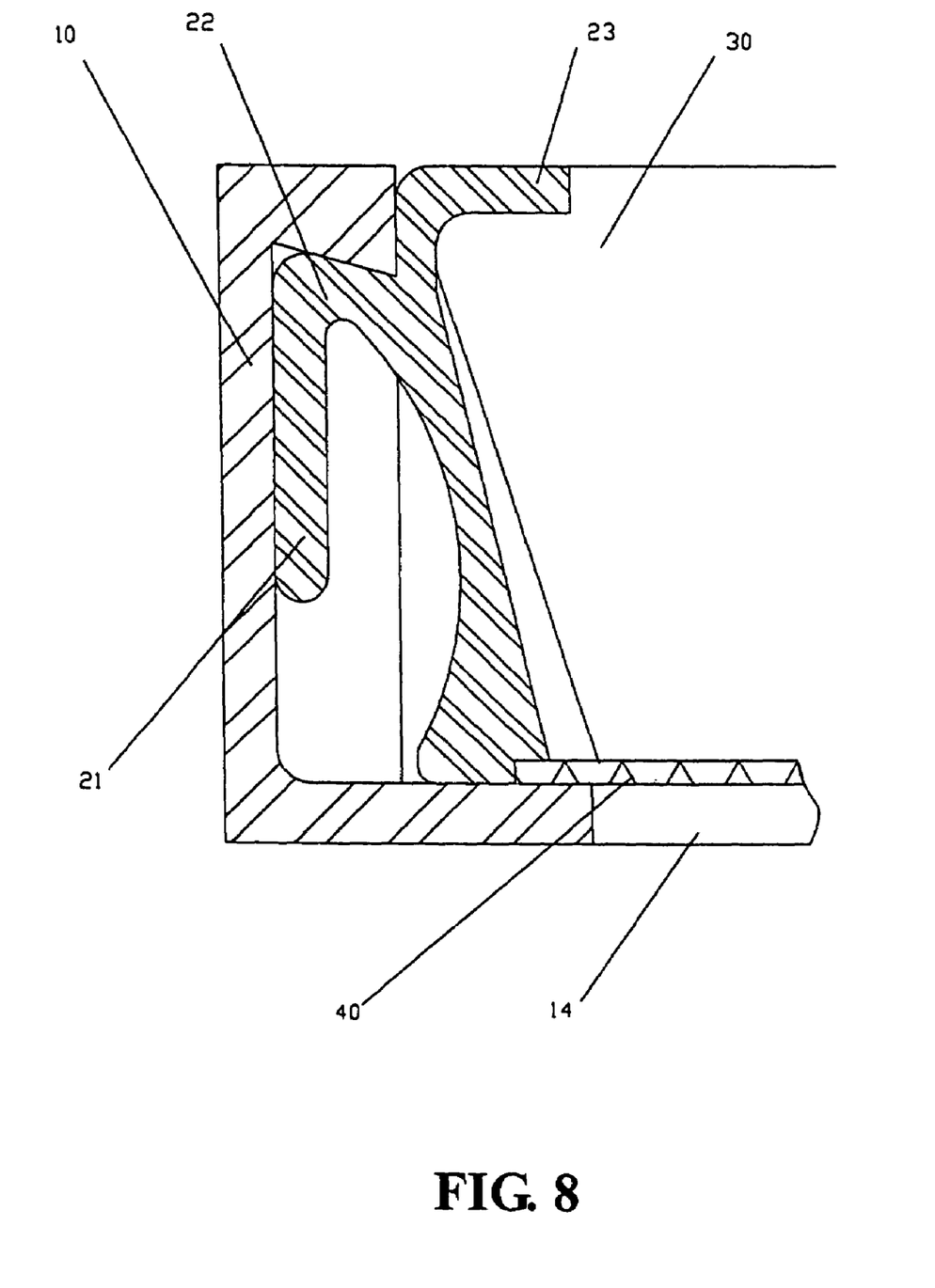
Figure 9:
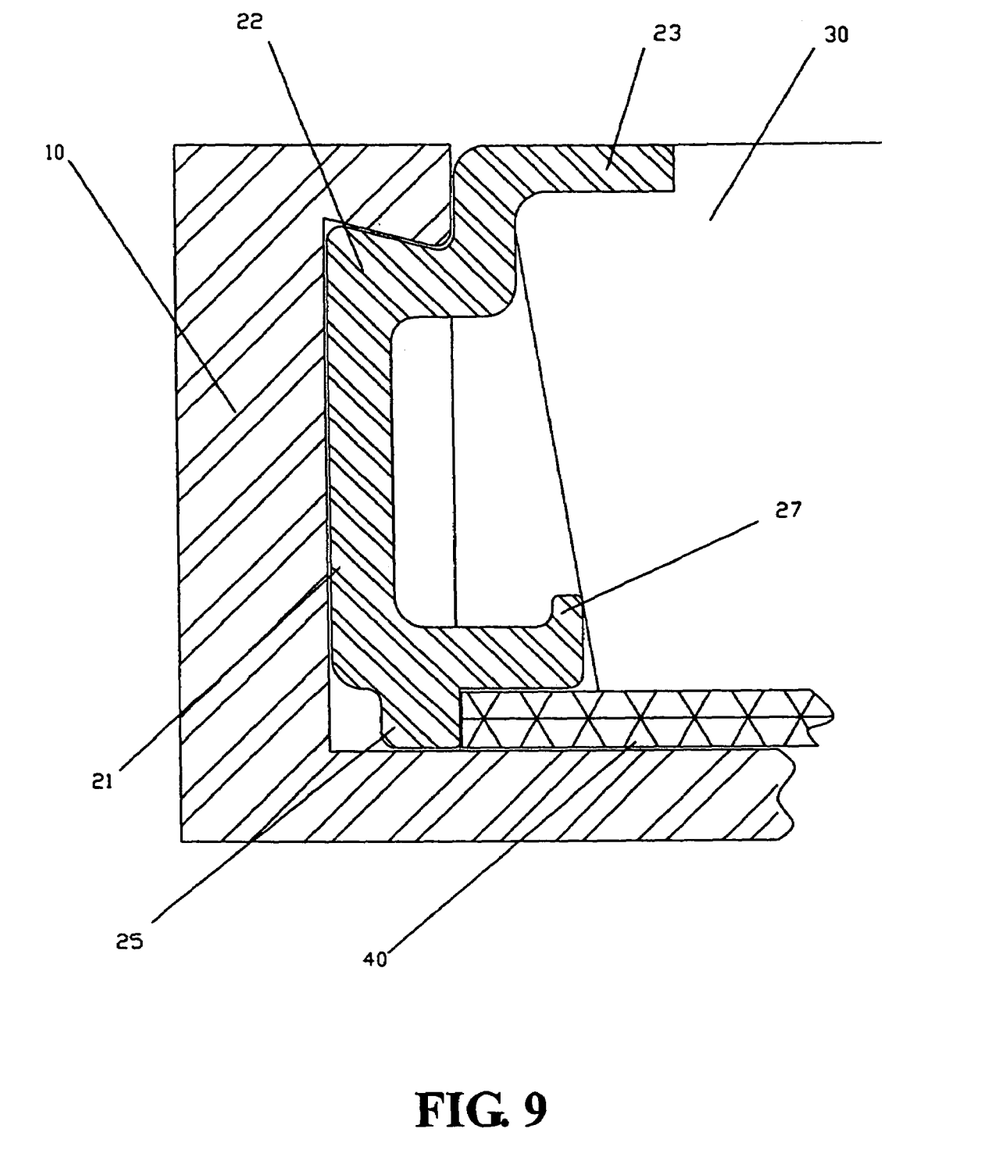
Figure 10:
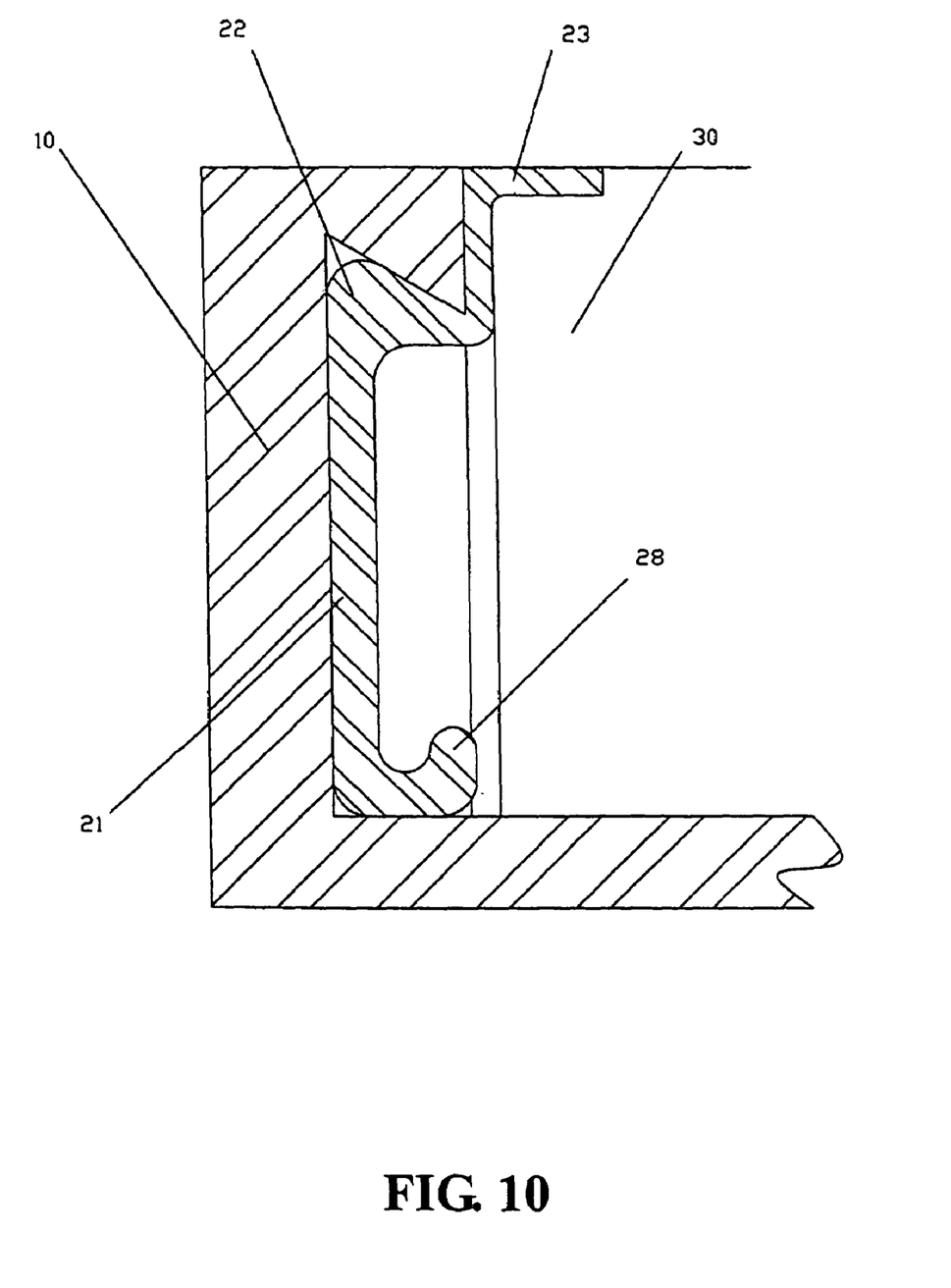
Figure 11:
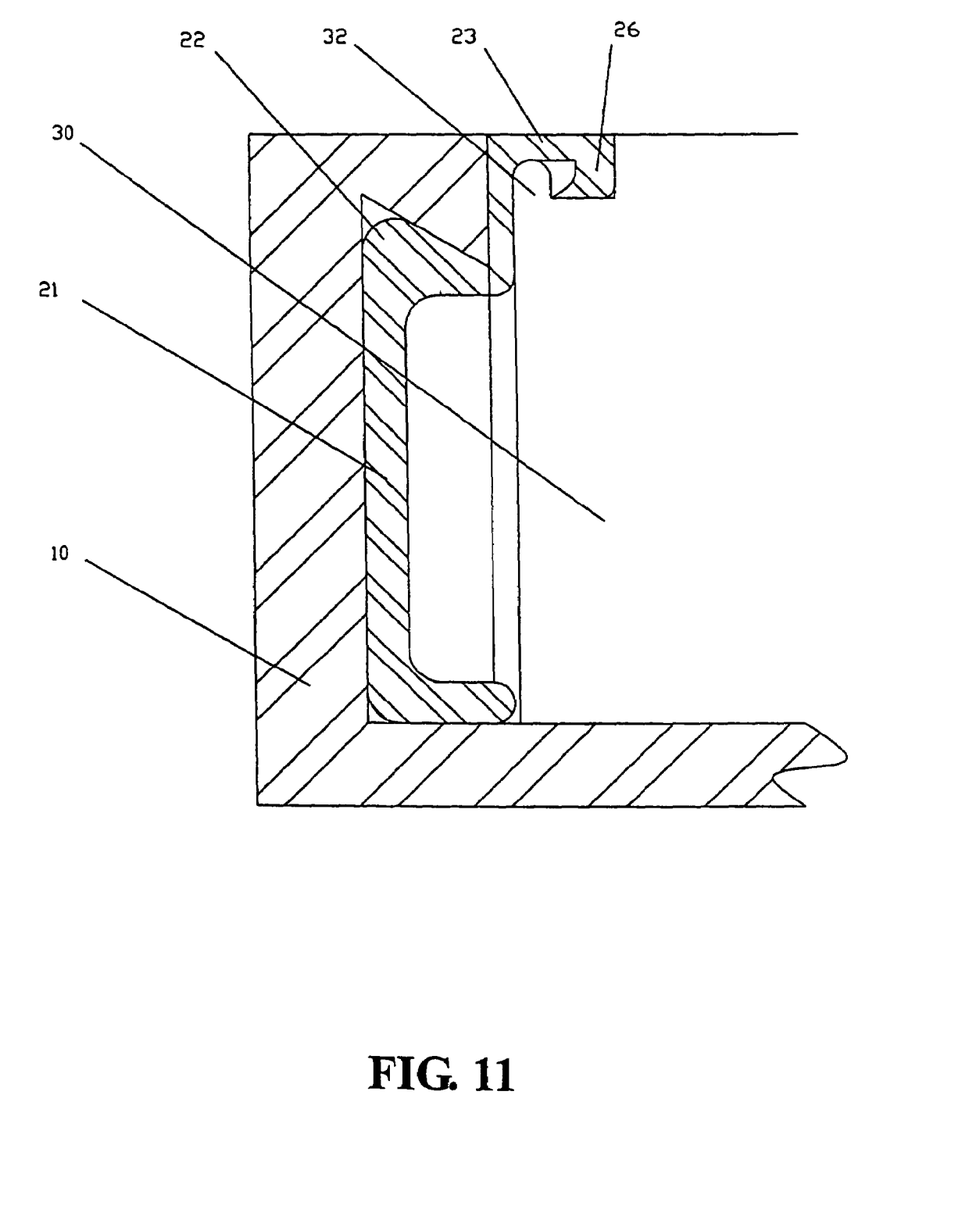
Figure 12:
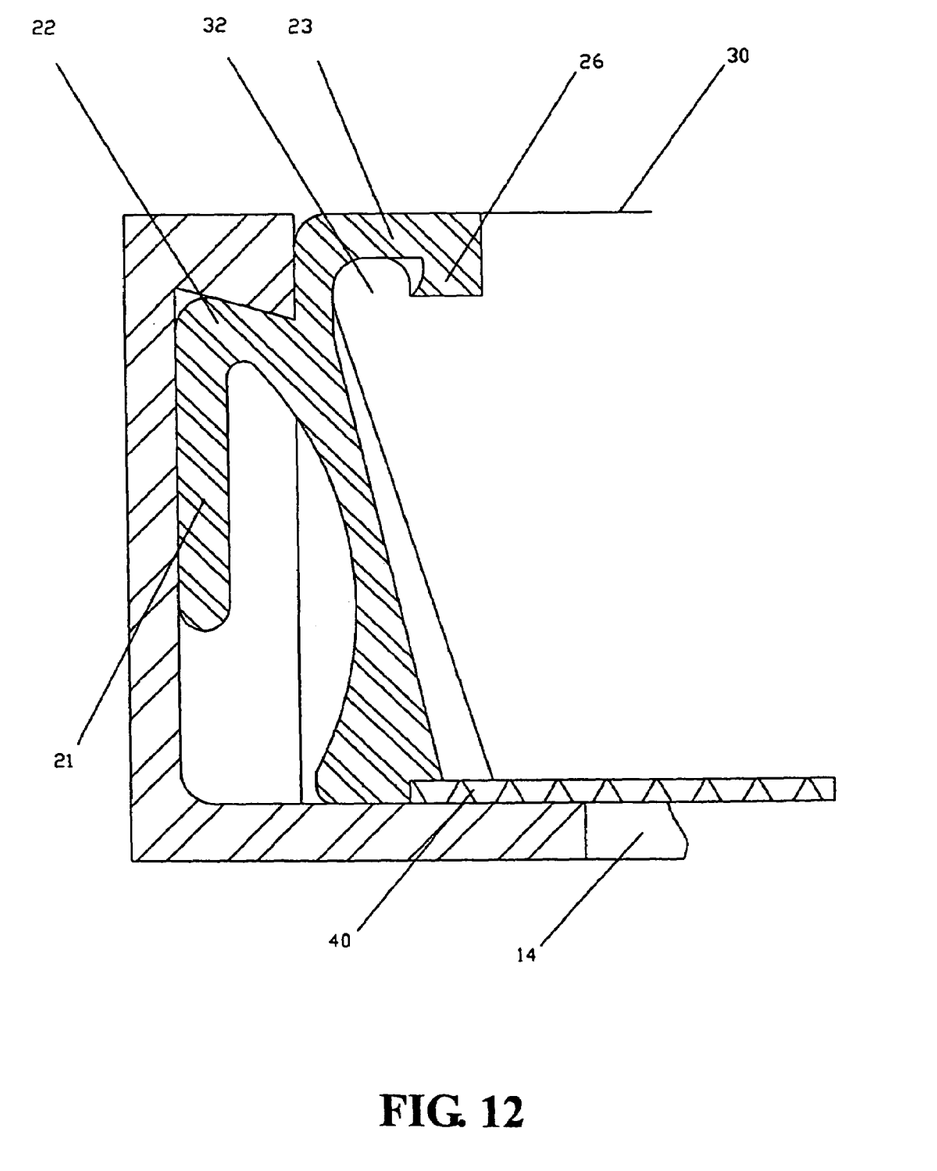
Figure 13:
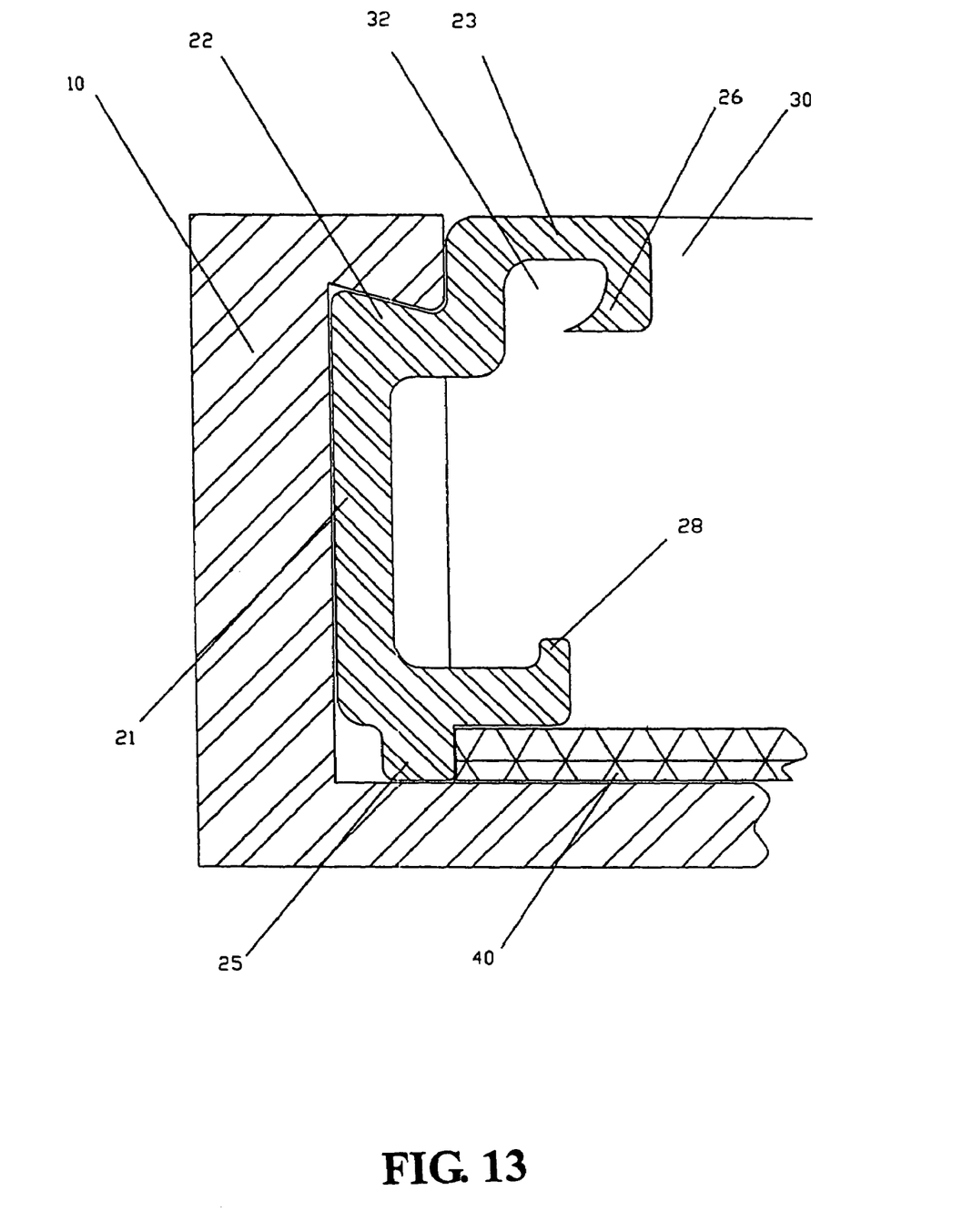

The r-shaped fastener has a support arm linked to the arch-shaped arm to form into the tray pressing plate. The support arm of the r-shaped fastener is shorter than that of the c-shaped fastener. A pressing rod 24 is positioned between the support arm and the arch-shaped arm. The pressing rod 24 facilitates eh loading and unloading of the r-shaped fastener onto/from the semi-dovetail slot, and the step-like recess on the pressing rod 24 is used to press the transparent covering plate 40. The c-shaped fastener has a tail section which has a reverse hook 27, and the reverse hook facilitates loading and unloading from the semi-dovetail slot so as to increase the protruded block 25, forming into the recess pressing against the transparent covering plate (as shown in FIGS. 9 and 10). The side edge at the recessed platform is formed into protruded peg 32 such that the tray of the c-shaped fastener and that of the r-shaped fastener are formed with a faster 26, and the fastener hook is engaged with the tray (as shown in FIGS. 10 and 13) and is firmly secured.

Figure 14:
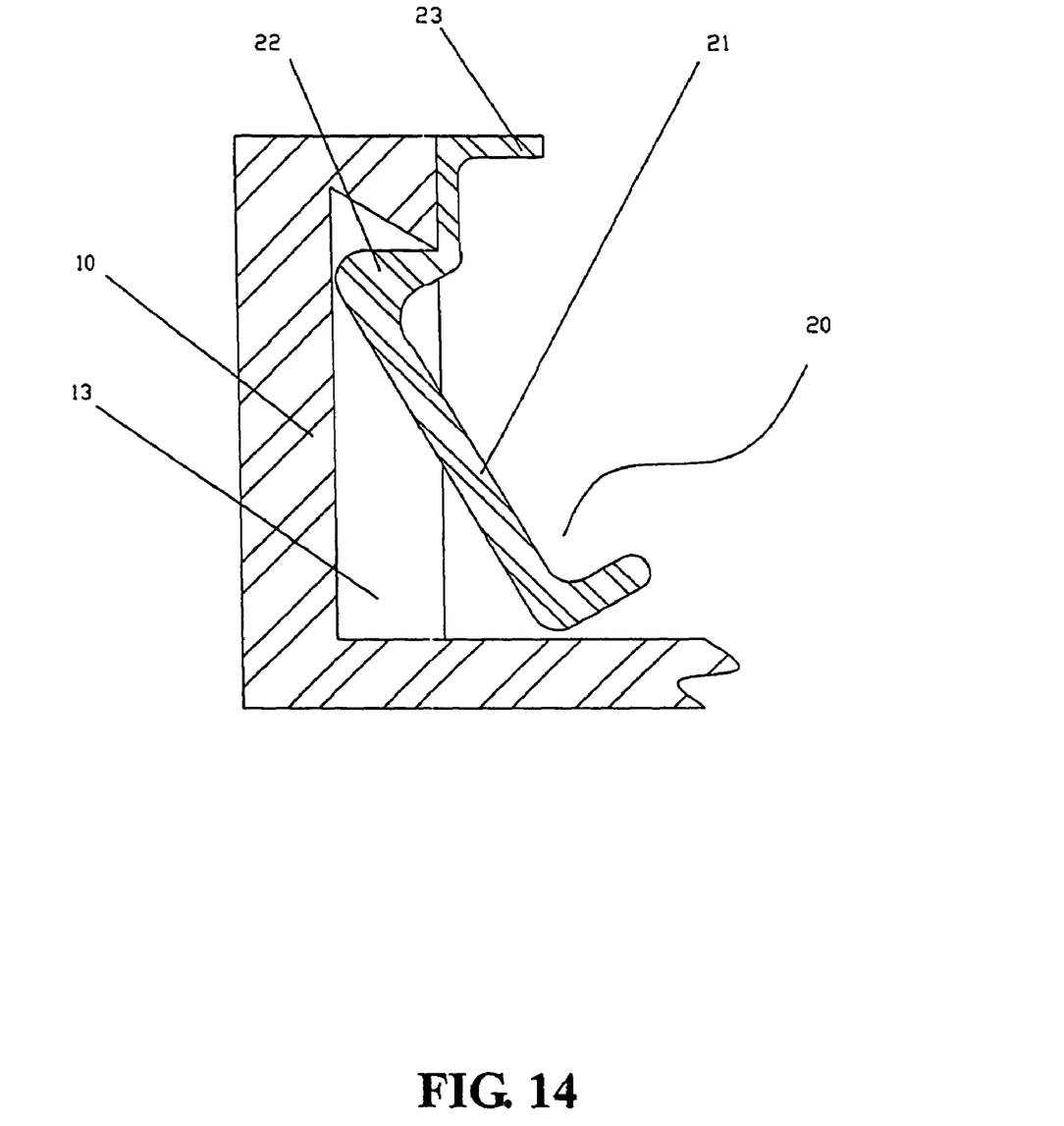
Figure 15:
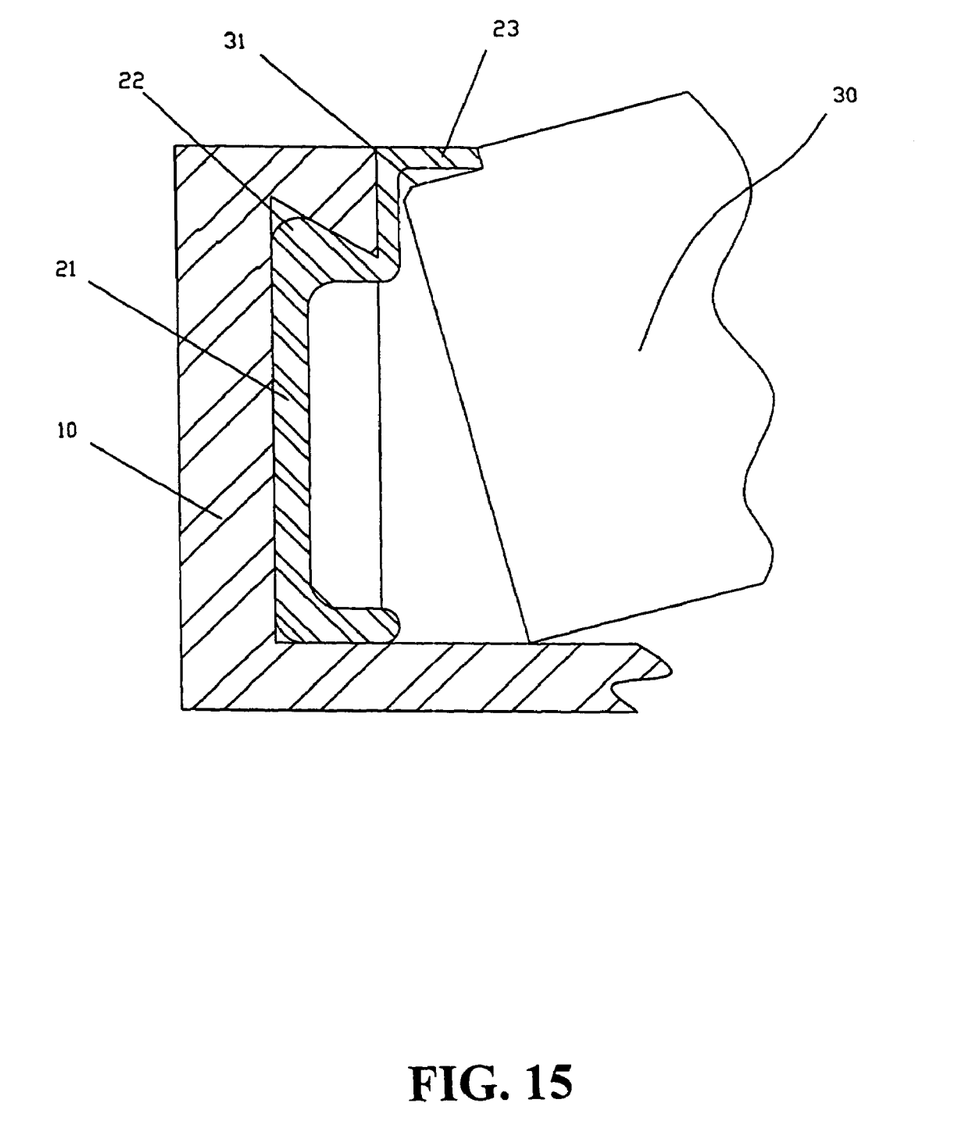

Referring to FIGS. 14 and 15, when the tray is loaded, the arch-shaped arm 22 of the faster 20' is engaged with the semi-dovetail slot 13, and the support arm 21 is rotated into the semi-dovetail slot. The recess platform 31 of the tray 30 is inserted into the tray pressing plate 23. The plate is sloping mounted in a slope such that the fastener is firmly secured to the tray. Based on this fastener structure, the box must contain two fasteners in order to have effective mounting. When the box body is reverted and the tray is thus slided downward, the support arm and the arch-shaped arm will stop the tray from sliding off, but the pressing plate presses against the tray pressing plate so that the tray is hold and it will not slide out from the box body.

As shown above, the manufacturing process of the box is simple and the cost of production is low. After an object is taken from the tray, the tray can be easily taken up and put back onto the box body.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A fastener for a packaging comprising
a box body, a tray and a fastener having a support arm and an arch-shaped arm, characterized in that the side frame of the box body and the bottom of the box body form into a cavity, and the inner sidewall of the side frame is a semi-dovetail slot and the side edge of the tray is a recessed platform, and the support arm and the arch-shaped arm are engaged at the semi-dovetail slot, and the tray positioned at the upper end of the fastener is pressed against the recessed platform such that the tray is fastened at the cavity of the box body,
whereby the loading and unloading of the tray are easy and the packaging is re-usable.

2. The fastener of claim 1, wherein the fastener includes a c-shaped fastener or a r-shaped fastener.

3. The fastener of claim 1, wherein the side edge of the recessed platform is a protruded peg in combination with the c-shaped fastener or the r-shaped fastener, and the fastener secures firmly with the tray.

4. The fastener of claim 1, wherein the box body is provided with a window with a transparent covering plate, and the covering plate has a step-like recess for engagement.

* * * * *